US012770803B2

(12) United States Patent
Lang et al.

(10) Patent No.: US 12,770,803 B2
(45) Date of Patent: Oct. 20, 2026

(54) SWITCHABLE CONTACTING DEVICE WITH COOLING FUNCTIONALITY

(71) Applicant: Eaton Intelligent Power Limited, Dublin (IE)

(72) Inventors: Volker Lang, Bonn (DE); Lutz Friedrichsen, Niederkassel (DE); Kai Schroeder, Langerwehe (DE); Gabriel Wiedera, Bonn (DE); Alexej Pogorelov, Erkelenz (DE)

(73) Assignee: EATON INTELLIGENT POWER, Dublin (IE)

( * ) Notice: Subject to any disclaimer, the term of this patent is extended or adjusted under 35 U.S.C. 154(b) by 319 days.

(21) Appl. No.: 18/687,211

(22) PCT Filed: Oct. 7, 2022

(86) PCT No.: PCT/EP2022/025467
§ 371 (c)(1),
(2) Date: Feb. 27, 2024

(87) PCT Pub. No.: WO2023/061623
PCT Pub. Date: Apr. 20, 2023

(65) Prior Publication Data
US 2024/0355556 A1 Oct. 24, 2024

(30) Foreign Application Priority Data
Oct. 14, 2021 (GB) ..................................... 2114687

(51) Int. Cl.
*H01H 1/62* (2006.01)
*H01H 1/14* (2006.01)

(52) U.S. Cl.
CPC ................ *H01H 1/62* (2013.01); *H01H 1/14* (2013.01)

(58) Field of Classification Search
CPC ............ H01H 1/62; H01H 1/14; H01H 45/12; H01H 50/12; H01H 9/52; H01H 2009/523
(Continued)

(56) References Cited

U.S. PATENT DOCUMENTS 3,740,510 A * 6/1973 Grunert ................ H01H 50/546 218/1
11,688,574 B2 * 6/2023 Wu .......................... H01H 9/36 335/196
2021/0112680 A1 4/2021 Rai et al.

FOREIGN PATENT DOCUMENTS

CN 211125547 U 7/2020
DE 2337933 A1 2/1975
(Continued)

*Primary Examiner* — Lheiren Mae A Caroc
(74) *Attorney, Agent, or Firm* — LEYDIG, VOIT & MAYER, LTD.

(57) ABSTRACT

A switchable contacting device with cooling functionality includes a current-carrying component, a housing for encasing the current-carrying component, and a heat dissipating component. The heat dissipating component is arranged to dissipate heat from the current-carrying component outside the housing. The current-carrying component includes a movable contact and a stationary contact device. The stationary contact device has a first section located inside the housing and a second section located outside the housing. The heat dissipating component is arranged inside the housing between the first section of the stationary contact device and the housing, and the heat dissipating component is designed as a thermally conductive pad.

5 Claims, 16 Drawing Sheets

(58) Field of Classification Search
USPC .......................................................... 200/289
See application file for complete search history.

(56) References Cited

FOREIGN PATENT DOCUMENTS

| | | | |
|---|---|---|---|
| DE | 102019103298 | A1 | 10/2019 |
| DE | 102020005369 | A1 | 3/2021 |
| EP | 2712040 | A1 | 3/2014 |
| EP | 3270402 | A1 | 1/2018 |
| EP | 3319100 | A1 | 9/2018 |
| GB | 2576338 | A | 2/2020 |
| GB | 2585838 | A | 1/2021 |
| KR | 20130084519 | A | 7/2013 |
| WO | 2020/090264 | A1 | 5/2020 |

* cited by examiner

SWITCHABLE CONTACTING DEVICE WITH COOLING FUNCTIONALITY

TECHNICAL FIELD

The disclosure relates to a switchable contacting device with cooling functionality for dissipating heat from current-carrying components disposed in a housing of the switchable contacting device.

BACKGROUND

A switchable contacting device, for example a short circuit switching device or a contactor, comprises switchable contacts in its housing, wherein the switchable contacts can be operated in a closed state to conduct a current between outer connections, and in an open state to interrupt the current flow. Due to the contact resistances of the switchable contacts, heat is generated inside the housing of the switchable contacting device in a normal operation mode, when a current flows through the switchable contacts in closed state.

Various cooling concepts for a switchable contacting device are shown in EP 3 319 100 A1, DE 23 37 933 A1, GB 2 576 338 A, GB 2 585 838 A, WO 2020/090264 A1, KR 2013 0084519, DE 10 2019 103298 A1, US 2021/112680 A1, DE 10 2020 005369 A1, CN 211 125 547 U, EP 3 270 402 A1 and EP 2 712 040 A1.

The current-carrying capacity requirements and therefore the thermal requirements for switchable contacting devices, such as short circuit switching devices or contactors, especially in electro vehicle applications are very high in relation to the cross-sections used for the current-carrying components. Due to limitations of installation space and limitations of the moving masses of the switchable contacts inside the switchable contacting devices, it is not possible to improve the current-carrying capacity by increasing the cross-sections of the current-carrying components to the necessary extent.

There is a need to provide a switchable contacting device with cooling functionality which allows to significantly improve the current-carrying capacity of the switchable contacting device without changing the cross-section of electrical conductors of the device.

SUMMARY

A switchable contacting device with cooling functionality by dissipating heat from a current-carrying conductor of the device is specified in claim 1.

The switchable contacting device comprises a current-carrying component, a housing for encasing the current-carrying component, and a heat dissipating component. The heat dissipating component is arranged to dissipate heat from the current-carrying component outside the housing, i.e. to the environment outside the housing.

The heat dissipating component is distinct from the housing and the current-carrying component. The heat dissipating component may be configured and arranged to provide basically four possible solutions of cooling functionality, i.e. an internal passive cooling, an internal active cooling, an external passive cooling, and an external active cooling.

An internal passive cooling concept can be realized by providing the heat dissipating component in the form of a thermally conductive mass body which dissipates the temperature from the internal of the housing via the thermally conductive mass body to an external thermal mass body.

The thermally conductive mass body protrudes into the housing of the switchable contacting device with one side, and out of the housing with its other side. The thermally conductive mass body may be arranged with its side protruding inside the housing close to the switchable contacts to absorb heat caused by the current flow through the closed contacts. The absorbed heat is dissipated at the side of the thermally conductive mass body protruding out of the housing. To enable sufficient thermal conductivity, the thermally conductive mass body may be made of a thermally conductive metal, for example configured as a mass body of aluminum.

A thermally conductive pad may be disposed on a portion of the side of the thermally conductive mass body protruding out of the housing to dissipate heat to the external thermal mass body. The switchable contacting device may be arranged so that the external thermal mass body is in contact with the thermally conductive mass body via the thermally conductive pad. The thermally conductive mass body can thus be galvanically separated from the housing, but still allow a good thermal connection to the housing for heat dissipation to the outside into the environment.

In particular, if the fixed contact is designed as a flat busbar, a passive cooling concept can be realized by arranging the heat dissipating component directly on the busbar of a stationary contact device of the switchable contacting device. The heat dissipating component is embodied as a thermally conductive (cooling) pad which is flexible and allows, on the one hand, to galvanically separate the electrically conductive busbar of the stationary contact device from the housing, but, on the other hand, still allows a good thermal coupling to the housing for heat dissipation to the outside of the housing.

According to an internal active cooling concept, the heat dissipating component may be provided in the form of a heat sink, through which a cooling liquid such as water or cooling oil flows. The heat dissipating component may comprise a body formed to provide a flow channel which protrudes from the outside inside the housing of the switchable contacting device, and thus enables to transfer the heat from the inside of the switchable contacting device to a suitable heat exchanger located outside the device via the liquid flowing in the flow channel.

According to a third concept of the switchable contacting device, an external passive cooling functionality can be implemented in the form of a thermally conductive mass body which is connected to at least one outer busbar.

According to a particular embodiment, the thermally conductive mass body may be connected to the at least one outer busbar via a thermally conductive pad. In this case, the temperature dissipates from the inside of the device via the at least one outer busbar, the thermally conductive mass body and the thermally conductive pad to an external thermal mass body that may be connected to the thermally conductive pad.

According to a fourth possible concept of the switchable contacting device, external active cooling can be implemented in the form of a heat sink being configured as a flow channel, through which a cooling liquid such as water or cooling oil flows. The flow channel may be provided in a particularly formed body which may be in contact to an outer busbar of the switchable contacting device and configured to dissipate heat from the outer busbar via the liquid in the flow channel to a heat exchanger mounted to the body forming the flow channel.

According to a particular configuration, a thermally conductive pad may be disposed between the outer busbar and the body forming the flow channel so that heat is transferred from the inside of the switchable contacting device via the outer busbar, the liquid flowing in the flow channel of the body and the thermally conductive pad to a suitable heat exchanger outside the switchable contacting device.

The various concepts to provide a cooling functionality may be used for switchable contacting devices which may be configured, for example, as a short circuit switching device or a contactor. Additional features and advantages are set forth in the detailed description that follows. It is to be understood that both the foregoing general description and the following detailed description are merely exemplary, and are intended to provide an overview or framework for understanding the nature and character of the claims.

BRIEF DESCRIPTION OF THE DRAWING

The accompanying figures are included to provide further understanding, and are incorporated in, and constitute a part of the specification. As such, the switchable contacting device will be more fully understood from the following detailed description, taken in conjunction with the accompanying figures.

DETAILED DESCRIPTION

Figure 1A:
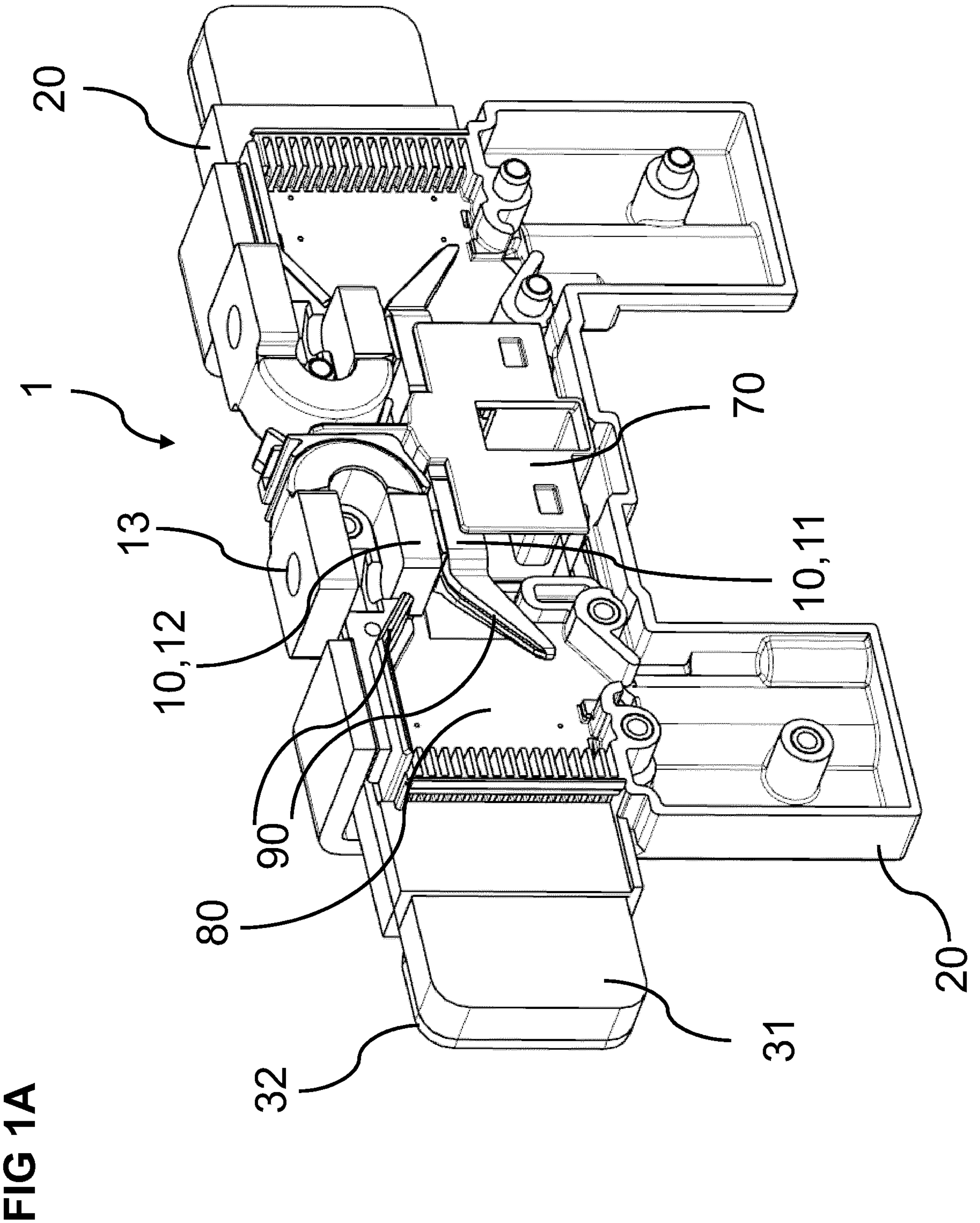
FIG. 1A shows perspective cross-sectional view of a switchable contacting device formed as a short circuit switching device with internal passive cooling functionality.

FIG. 1A shows a perspective illustration of a cross-sectional view of a switchable contacting device 1 having an internal passive cooling concept. The switchable contacting device 1 is configured in the shown illustration as a short circuit switching device.

The switchable contacting device 1 comprises a current-carrying component 10 having a movable contact device 11 and a stationary/fixed contact device 12. The stationary contact 12 comprises a terminal 13 that may be connected to an outer busbar at which the current can be tapped. The movable contact device 11 is mounted to a carrier 70. In a normal operation mode, the movable contact device 11 is in contact with the stationary contact device 12 so that a current flow is provided between the closed contacts. In order to interrupt the current flow the movable contact device 11 may be switched in an open position so that an air gap is established between the movable contact device 11 and the stationary contact device 12.

The current switching mechanism comprising the current-carrying component 10 with the movable contact device 11, the stationary contact device 12, the extinguishing chamber 80 and arc guiding rails 90 is encased in a housing 20.

To switch off small currents, a magnetic field is needed to drive an arc into the extinguishing chamber 80. Referring to the perspective view of the switchable contacting device shown in FIG. 1B, for small short-circuit currents, for example currents<5 kA, the magnetic field is generated by a permanent magnet 100, and returned via a yoke 110. For large short-circuit currents, i.e. currents larger than 5 kA, the arc generated between the stationary contact device and the movable contact device is driven into the extinguishing chamber 80 by an intrinsic field generated by the high short-circuit current. In order to generate the intrinsic field, the stationary contact device 12 is formed as a bent busbar to provide a current loop so that the current direction is reversed.

Figure 1B:
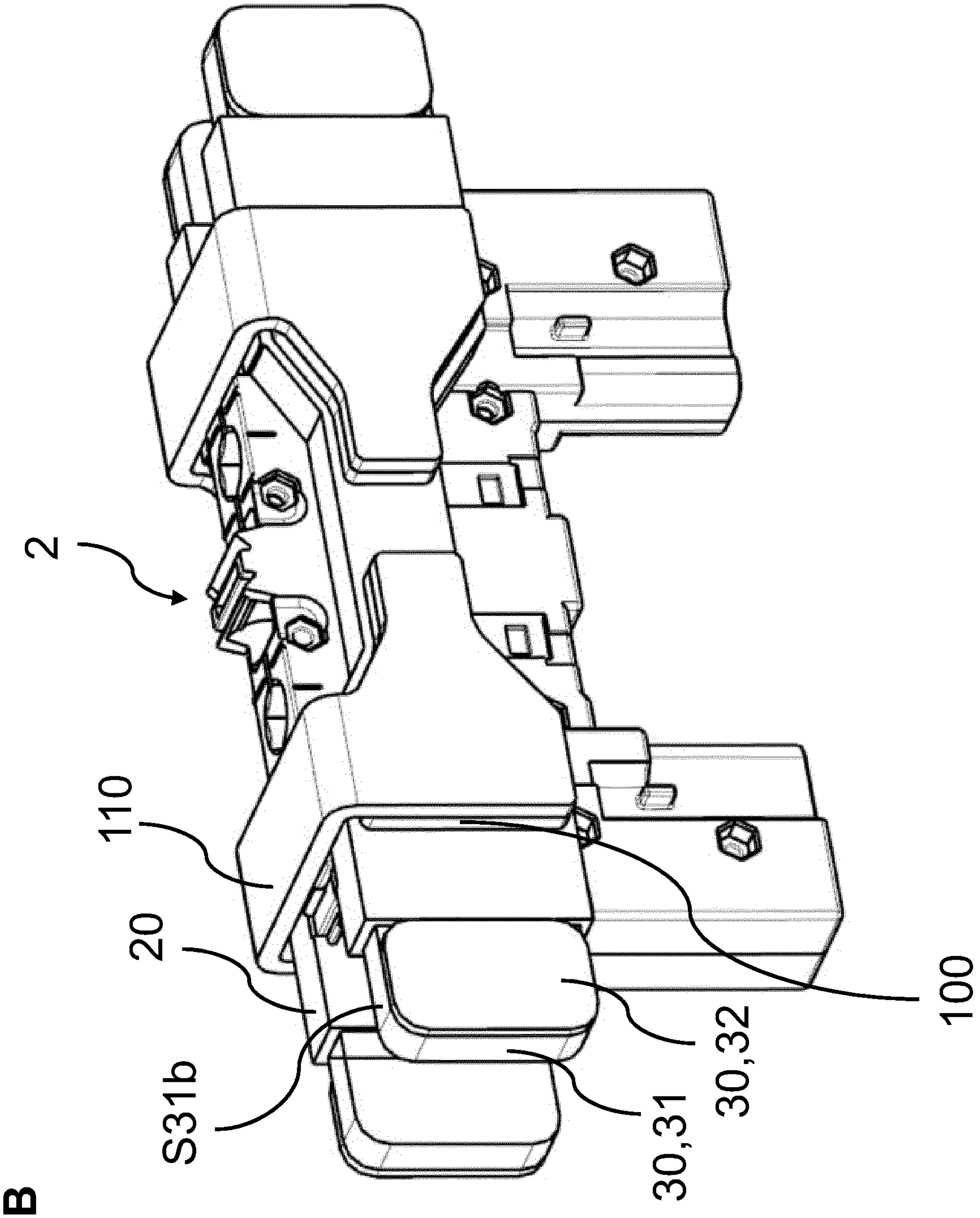
FIG. 1B shows a perspective view of a switchable contacting device with internal passive cooling functionality.
Figure 1C:
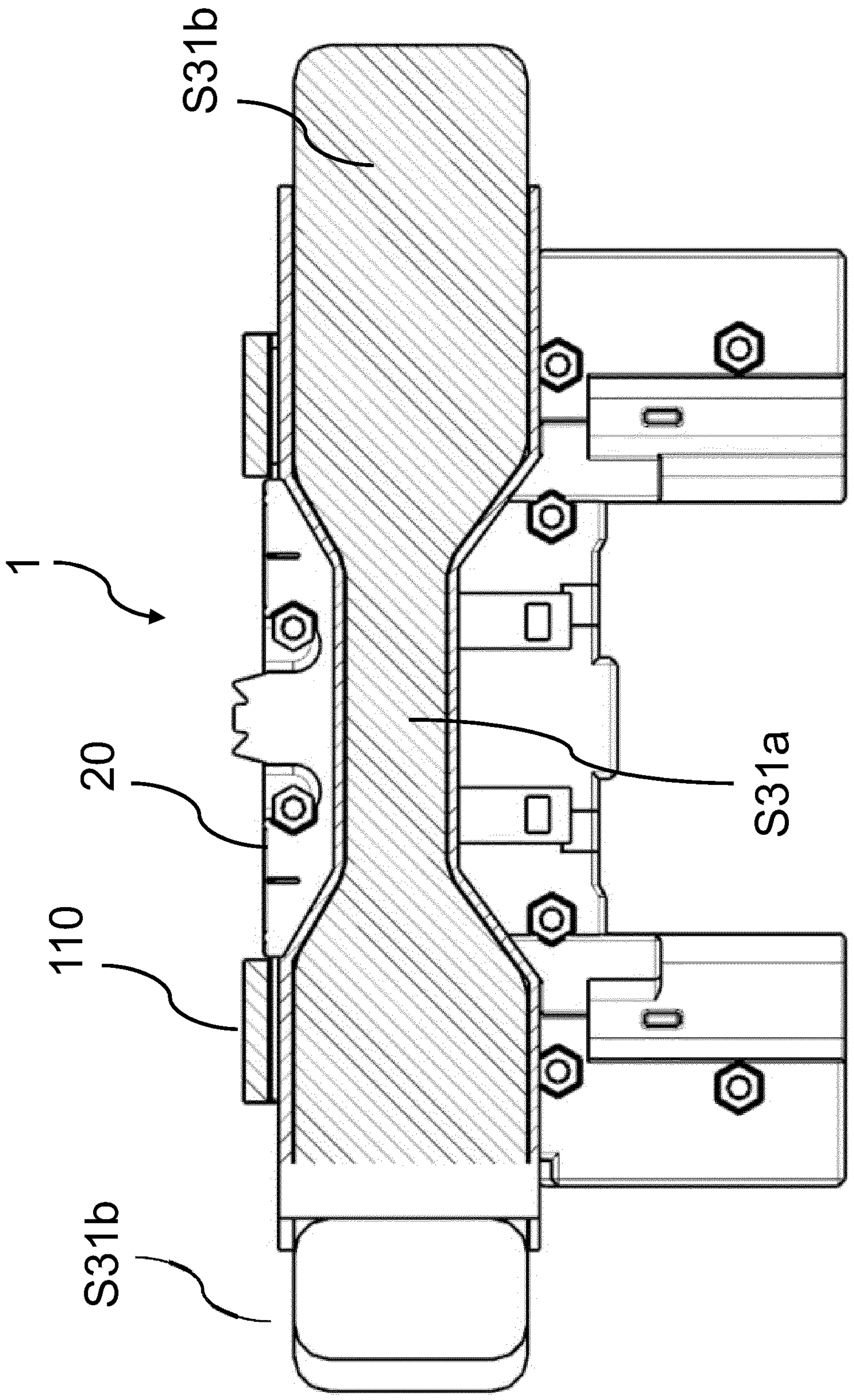
FIG. 1C shows a cross-sectional view of a switchable contacting device with internal passive cooling functionality.

The switchable contacting device 1 illustrated in FIGS. 1A to 1C comprises a heat dissipating component 30 to realize the internal passive cooling concept of the device. The heat dissipating component 30 is arranged to dissipate heat from the current-carrying component 10 outside the housing 20. For this purpose, the heat dissipating component 30 is arranged close to the current-carrying component 10, i.e. the movable contact 11 and the stationary contact 12.

The heat dissipating component 30 comprises a thermally conductive mass body 31. Referring to FIG. 1C, the thermally conductive mass body 31 is arranged so that a first section S31*a* of the thermally conductive mass body 31 is located inside the housing 20 and a second section S31*b* of the thermally conductive mass body 31 protrudes from the housing 20. The thermally conductive mass body 31 may be made of a heat conductive material, for example aluminum, to transfer the heat generated at the current-carrying component 10 during a current flow outside the housing 20.

According to a possible embodiment, the heat dissipating component 30 may comprise a thermally conductive pad 32. The thermally conductive pad 32 may be arranged on the second section S31*b* of the thermally conductive mass body 31. In particular, the thermally conductive pad 32 may be located on a surface of the thermally conductive mass body 31 that is arranged outside the housing 20. The thermally conductive pad 32 is configured to provide a contacting surface for contacting an external thermal mass body to dissipate heat from the thermally conductive mass body 31 to the external thermal mass body (not shown in FIGS. 1A to 1C).

Figure 2A:
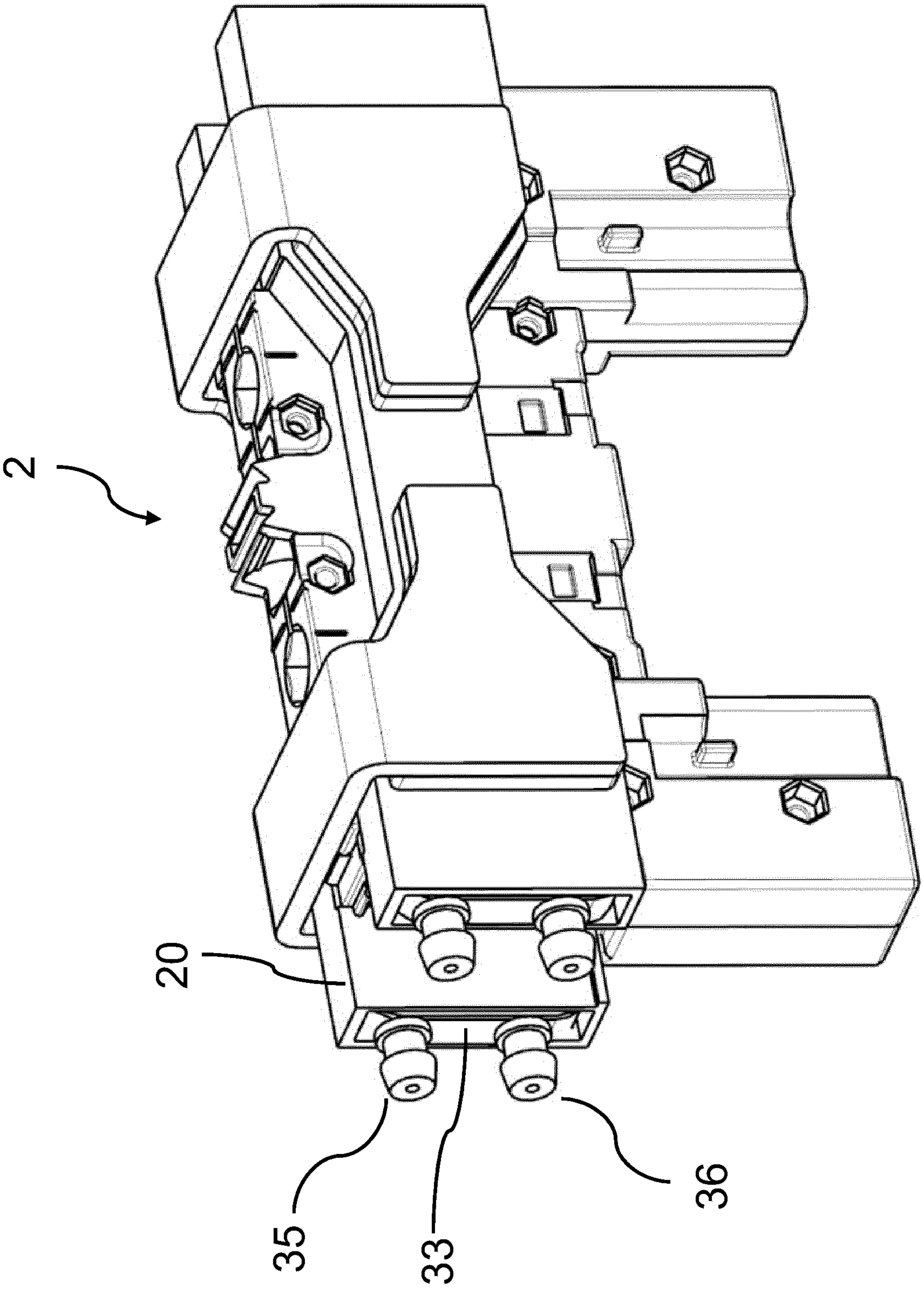
FIG. 2A shows a perspective view of a switchable contacting device with internal active cooling functionality.
Figure 2B:
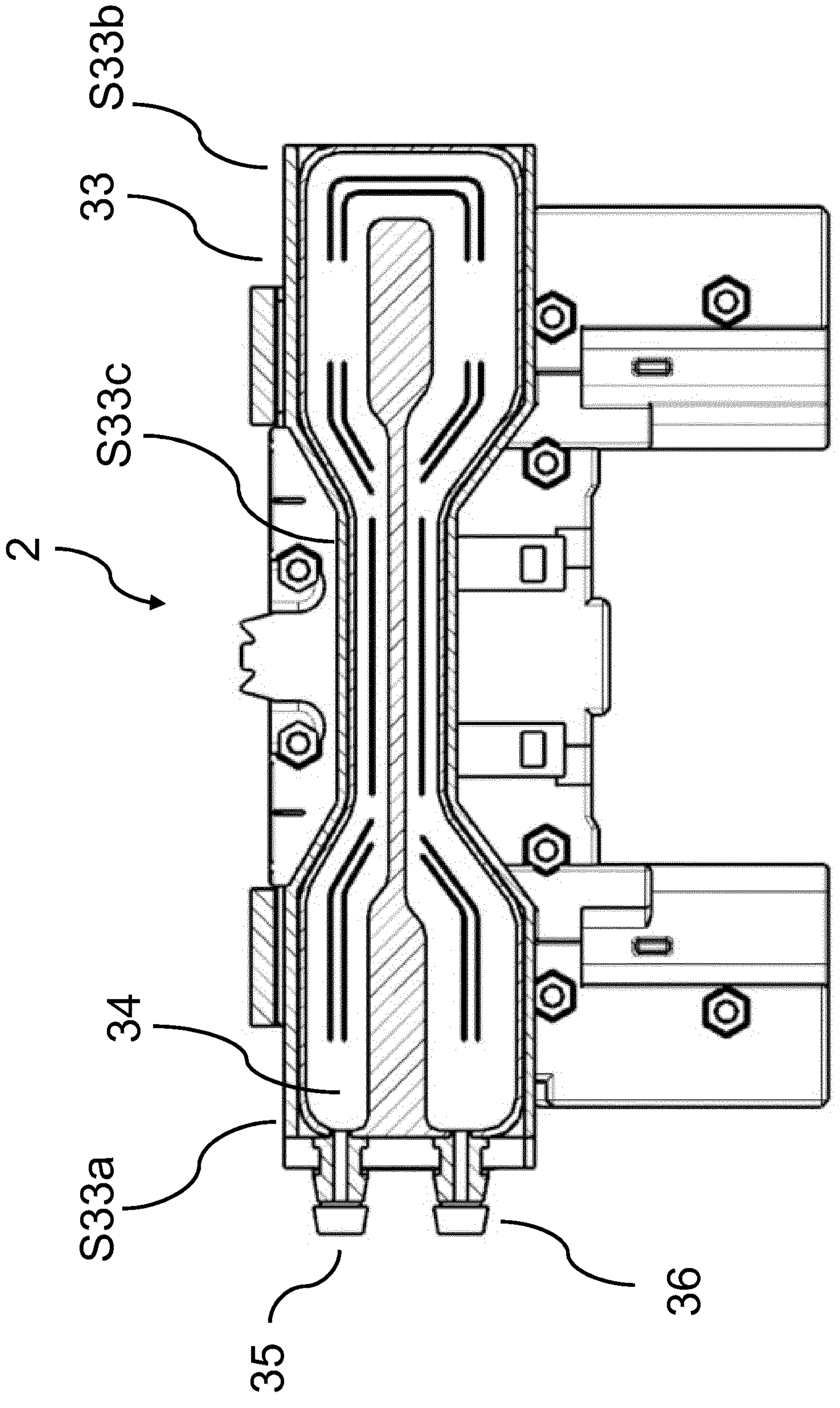
FIG. 2B shows a cross-sectional view of a switchable contacting device with internal active cooling functionality.

FIGS. 2A and 2B illustrate a second embodiment of a switchable contacting device 2 with a second concept to provide cooling of the switchable contacting device 2. FIG. 2A shows the switchable contacting device 2 with a housing 20 for encasing the current-carrying component, as shown for example in FIG. 1A.

Referring to FIGS. 2A and 2B, the cooling functionality of the switchable contacting device 2 is realized by an internal active cooling concept. In this case, the heat dissipating component 30 comprises a body 33 formed to provide a flow channel 34 for a liquid, such as water or cooling oil. The flow channel 34 has an inlet 35 for the liquid to flow into the flow channel 34, and an outlet 36 for the liquid to flow out of the flow channel 34.

The inlet 35 and the outlet 36 are arranged at a first portion S33*a* of the body 33. As illustrated in the cross-sectional view of the flow channel 34 shown in FIG. 2B, the flow channel 34 is formed so that the liquid flows from the inlet 35 of the flow channel in a forward direction to a second portion S33*b* of the body 33, and from the second portion S33*b* of the body 33 in a backward direction to the outlet 36 of the flow channel 34.

The body 33 is formed so that at least a third portion S33*c* of the body arranged between the first and second portions S33*a*, S33*b* of the body is located inside the housing 20. In conclusion, a liquid that flows from the inlet 35 into the housing 20, and from second portion S33*b* protruding out of the housing 20 backwards into the housing 20 to the outlet 36 transfers the heat from the inside of the switchable contacting device 2 to an external heat exchanger. The heat exchanger may be coupled to the inlet 35/outlet 36 outside of the device.

Figure 3A:
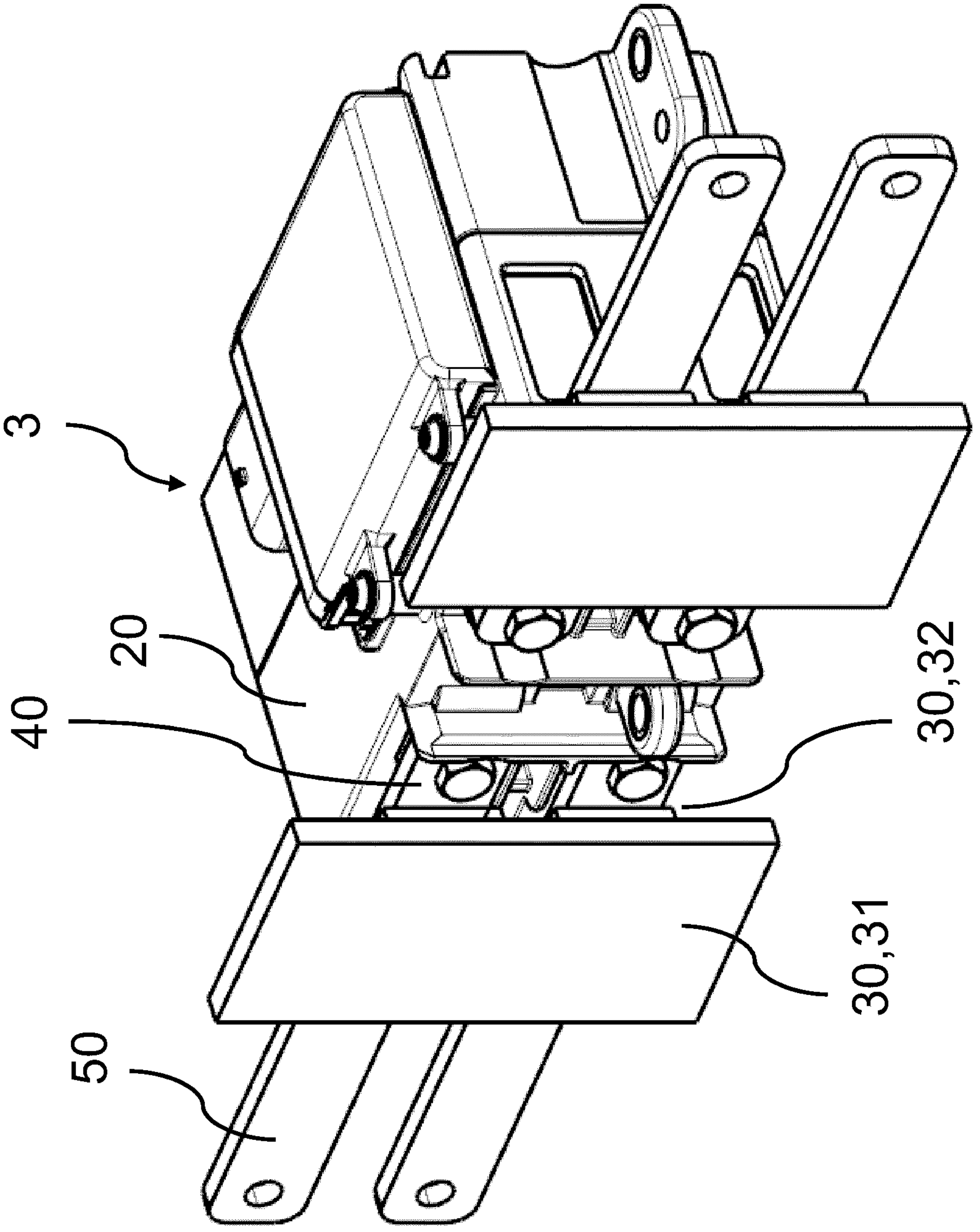
FIG. 3A shows a perspective view of a switchable contacting device with external passive cooling according to a first embodiment.
Figure 3B:
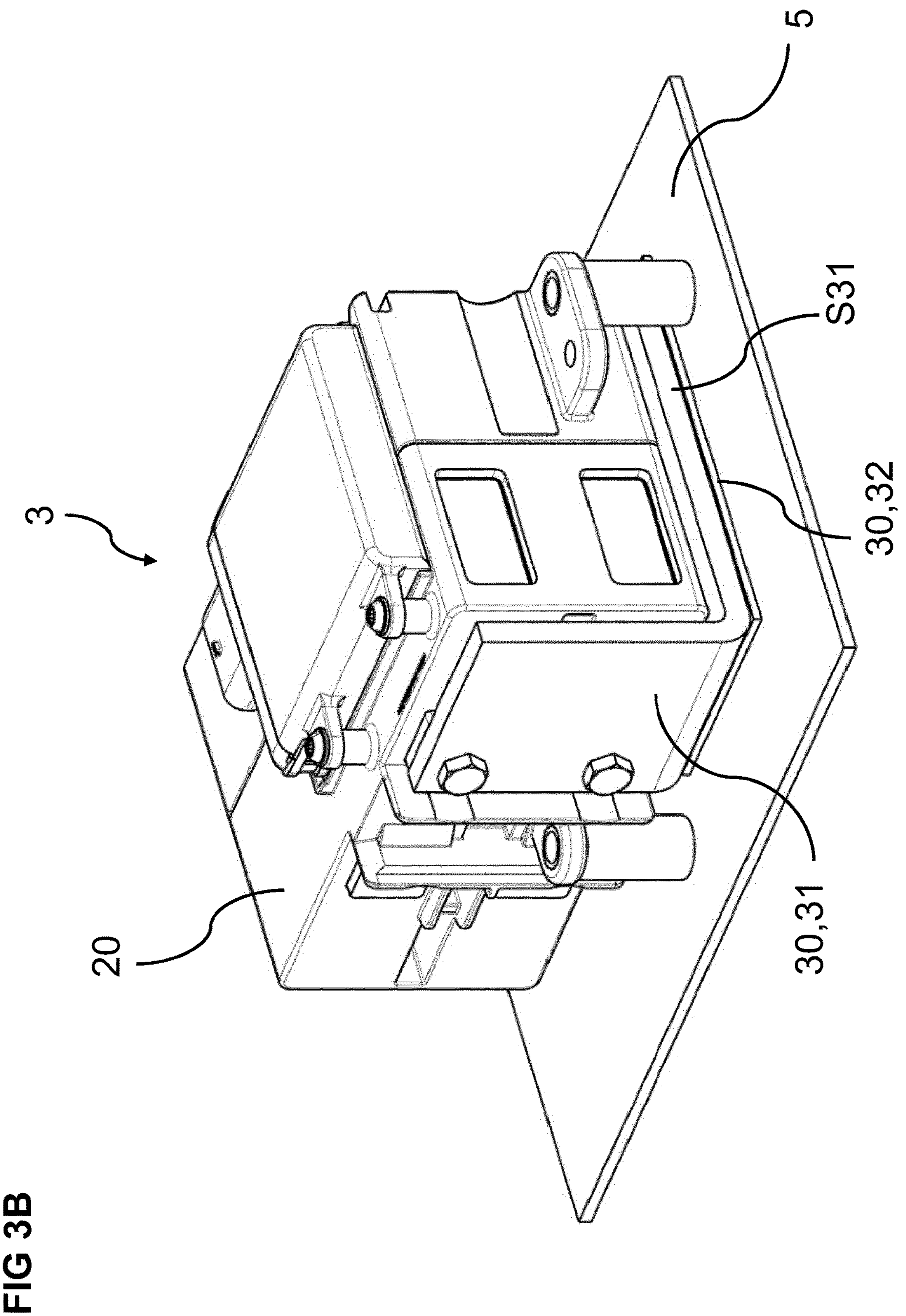
FIG. 3B shows a perspective view of a switchable contacting device with external passive cooling according to a second embodiment.
Figure 3C:
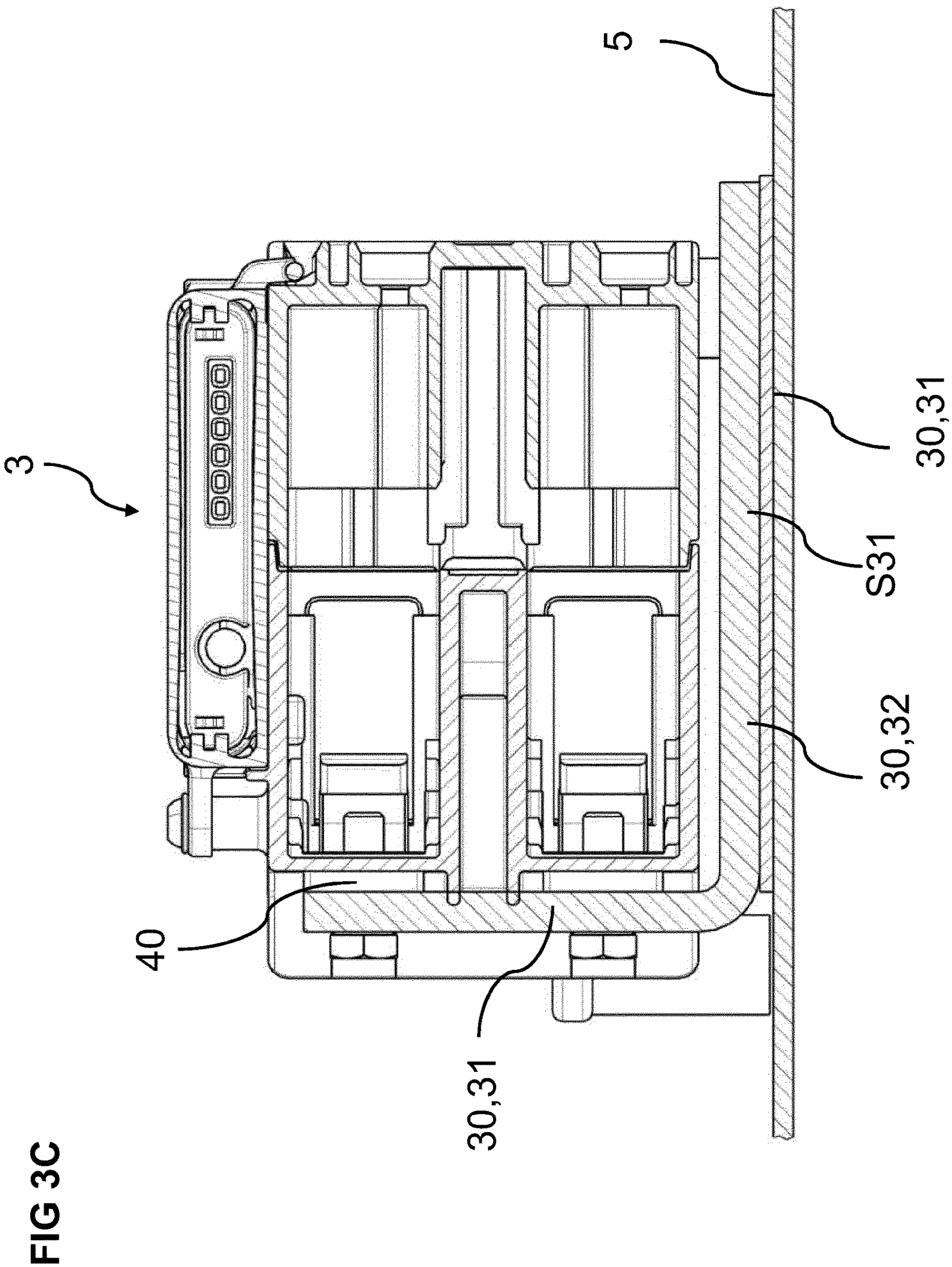
FIG. 3C shows a cross-sectional view of a switchable contacting device with external passive cooling functionality according to the second embodiment.

FIGS. 3A to 3C illustrate an external passive cooling concept to transfer heat from a switchable contacting device 3 to an external thermal mass body. The switchable contacting device 3 comprises a current-carrying component, as illustrated for example in FIG. 1A, that is encased in a housing 20, and a heat dissipating component 30. The heat dissipating component 30 is arranged to dissipate heat from the current-carrying component 10 outside the housing 20.

The heat dissipating component 30 comprises a thermally conductive mass body 31. The switchable contacting device 3 further comprises at least one outer connection 40 for externally contacting the current-carrying component encased in the housing 20.

As shown in FIG. 3A, the switchable contacting device 3 comprises at least one outer busbar 50 mounted to the at least one outer connection 40. The thermally conductive mass body 31 is mounted to the at least one outer busbar 50 which allows to transfer heat from the at least one outer busbar 50 to an external thermal mass body 5, as illustrated in FIGS. 3B and 3C, that is coupled to the thermally conductive mass body 31. The external thermal mass body 5 may be a carrier for supporting the switchable contacting device 3.

According to an embodiment of the switchable contacting device 3, the heat dissipating component 30 comprises a thermally conductive pad 32. Referring to the configuration of the switchable contacting device 3 shown in FIG. 3A, the thermally conductive pad 32 is arranged between the at least one outer busbar 50 and the thermally conductive mass body 31. The thermally conductive cooling pad 32 enables a galvanic separation of the thermally conductive mass body 31 from the thermal mass body/carrier 5, and, in addition, a thermal coupling to the mass body/carrier 5 for heat dissipation.

According to another embodiment of the switchable contacting device 3 illustrated in FIGS. 3B and 3C, the thermally conductive mass body 31 is configured as a bent body that is connected to at least one outer connection 40. The thermally conductive mass body 31 is embodied as a bent body that runs along a side wall of the housing 20 to a bottom wall of the housing. The thermally conductive pad 32 is arranged on a section S31 of the thermally conductive mass body 31 between the thermally conductive mass body 31 and the thermal mass body 5. The section S31 of the thermally conductive mass body runs along the bottom side of the housing 20. The section S31 has a surface being configured for contacting the external thermal mass body 5 via the thermally conductive pad 32 to dissipate heat from the thermally conductive mass body 31 to the external thermal mass body 5.

Figure 4A:
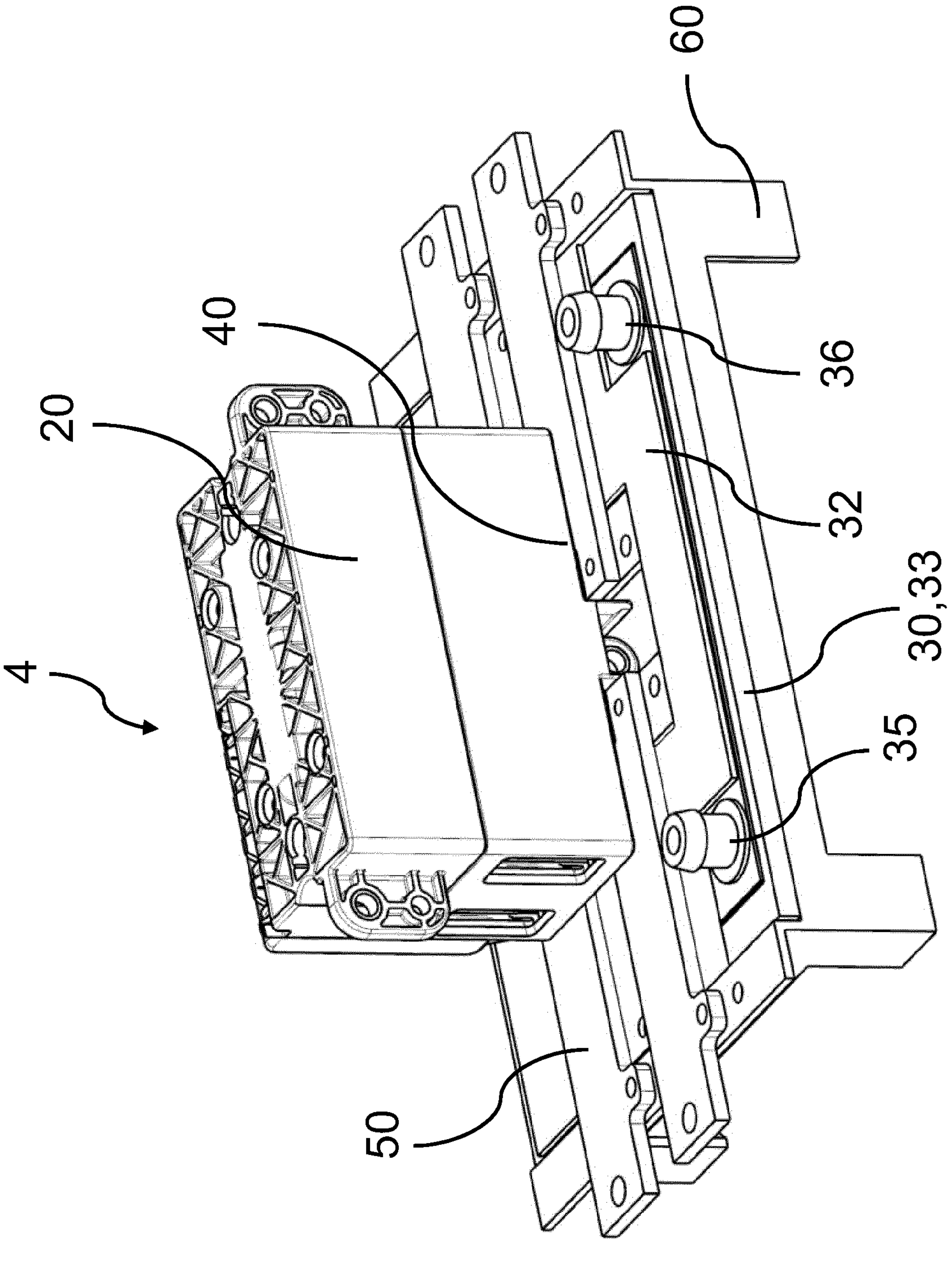
FIG. 4A shows a perspective view of a switchable contacting device with external active cooling functionality.
Figure 4B:
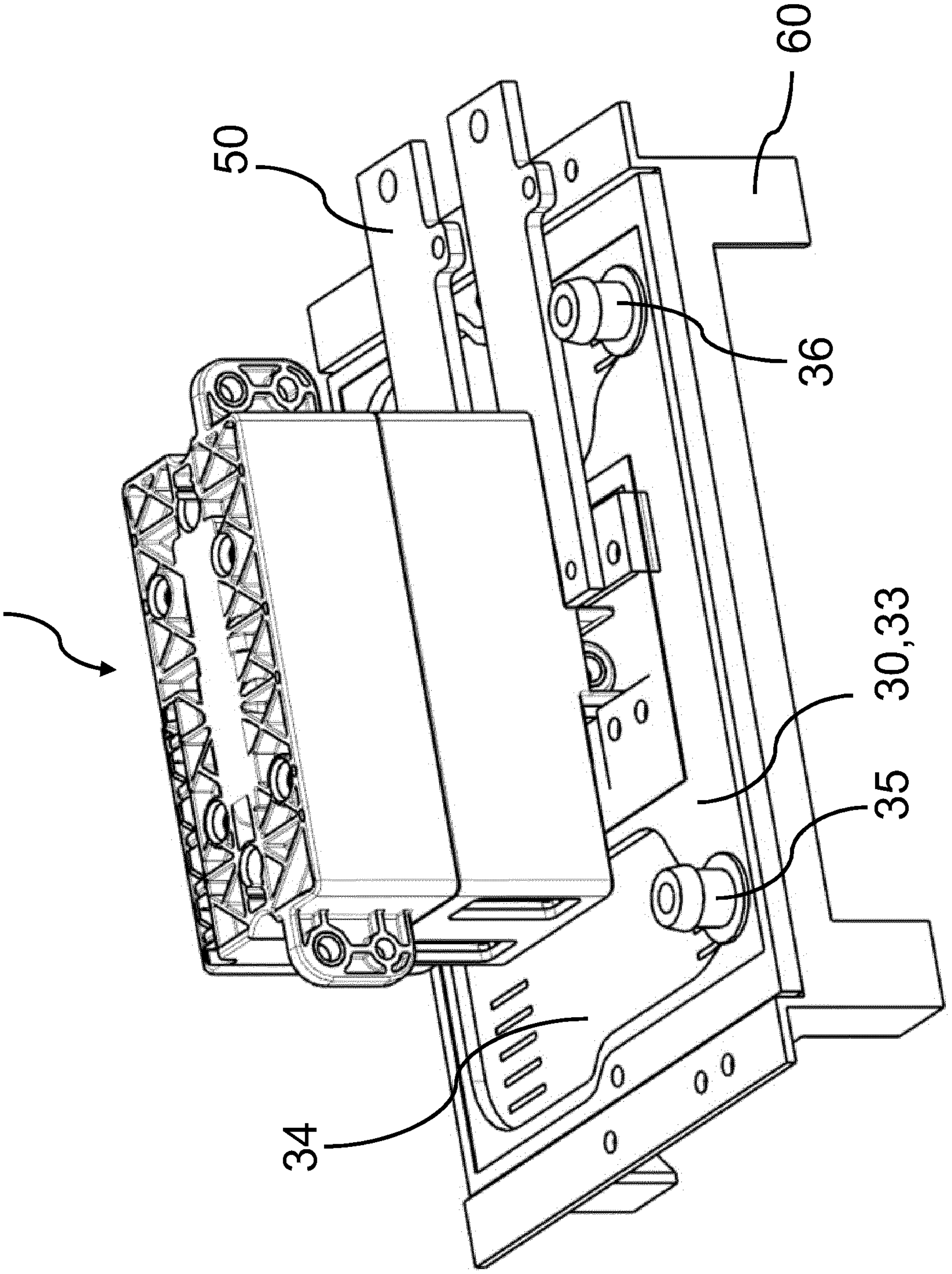
FIG. 4B shows a perspective view of a switchable contacting device with an open illustration of a flow channel to provide external active cooling.

An embodiment of a switchable contacting device 4 having an external active cooling functionality is illustrated in FIGS. 4A and 4B. The switchable contacting device 4 comprises a current-carrying component, for example as illustrated in detail in FIG. 1A, that is encased in a housing 20. The switchable contacting device 4 further comprises a heat dissipating component 30 being arranged to dissipate heat from the current-carrying component 10 outside the housing 20.

The heat dissipating component 30 comprises a body 33 formed to provide a flow channel 34 for a liquid, such as water or cooling oil. The flow channel 34 has an inlet 35 for the liquid to flow into the flow channel 34 and an outlet 36 for the liquid to flow out of the flow channel 34.

The switchable contacting device 4 comprises at least one outer connection 40 for externally contacting the current-carrying component. Furthermore, the switchable contacting device 4 comprises at least one outer busbar 50 mounted to the at least one outer connection 40, and a supporting device 60 to support the housing 20 and the body 33 forming the flow channel 34. The body 33 is placed in a cavity of the supporting device 60. The supporting device 60 is configured to be mounted to an external heat exchanger not shown in FIGS. 4A and 4B.

The body 33 forming the flow channel 34 is in contact to the at least one outer busbar 50 and the supporting device 60. The body 33 forming the flow channel 34 is configured to dissipate heat from the at least one outer busbar 50 via the liquid flowing in the flow channel 34 to the external heat exchanger mounted to supporting device 60.

According to an embodiment of the switchable contacting device 4, the heat dissipating component 30 may comprise a thermally conductive pad 32 being arranged between the at least one outer busbar 50 and the body 33 forming the flow channel 34. The heat dissipating component 30 is configured to dissipate heat from the at least one outer busbar 50 to the liquid flowing in flow channel 34 via the thermally conductive pad 32 so that the heat is transferred from the inside of the switchable contacting device 4 via the at least one outer busbar 50 and the thermally conductive pad 32 to the external heat exchanger mounted to supporting device 60.

FIGS. 5A to 6C show various views to embodiments 5 and 6 of a switchable contacting device having a flat stationary contact device 12 with internal passive cooling functionality. In the embodiments shown, the flat stationary/fixed contact device 12 is shaped in such a way that a current loop is formed in which the current direction is reversed, so that at high short-circuit currents an intrinsic field is generated through which the short-circuit current is driven into an extinguishing chamber. FIGS. 5A to 6C show the movable contact device 11, the stationary/fixed contact device 12, and the extinguishing chamber 80 with an arrangement of extinguishing plates 81.

Referring to the embodiments 5 and 6 of the switchable contacting device, the current carrying component 10 comprises a movable contact device 11 and a stationary contact device 12. The stationary contact device 12 has a section S12*a* located inside the housing 20 and a section S12*b* located outside the housing 20, as shown in the cross-sectional views of FIGS. 5B and 6B. The heat dissipating component 30 is arranged between the first section S12*a* of the stationary contact device 12 and the housing 20. The heat dissipating component 30 is arranged inside the housing 20. For reasons of simplification, the housing 20 has not been drawn in FIGS. 5A and 5C or 6A and 6C.

The stationary contact device 12 comprises a terminal 13 for externally contacting the stationary contact device 12. The terminal 13 is located in the second section S12*b* of the stationary contact device 12. The stationary contact device 12 comprises a contact pad 14 being configured for providing an electrical contact between the stationary contact device 12 and the movable contact device 11. The contact pad 14 is located in section S12*a* of the stationary contact device 12. The stationary contact device 12 is geometrically formed so that the current is conducted between the terminal 13 and the contact pad 14 in opposite directions.

The heat dissipating component 30 is disposed on a surface of the stationary contact device 12 facing away from the contact pad 14. The heat dissipating component 30 may be configured as a thermally conductive (cooling) pad. The heat dissipating component 30 is arranged directly on the stationary contact device 12, preferably at the point of highest contact resistance between the movable contact device 11 and the stationary contact device 12, since the most heat is generated at this point in the event of a short circuit. In particular, the heat dissipating component 30 is arranged between a busbar of the stationary contact device 12 and the housing 20. In particular, when using a thermally conductive pad, the busbar of the fixed contact device 12 can thus be galvanically separated from the housing 20, but still allow a good thermal connection to the housing 20 for heat dissipation to the outside into the environment.

Figure 5A:
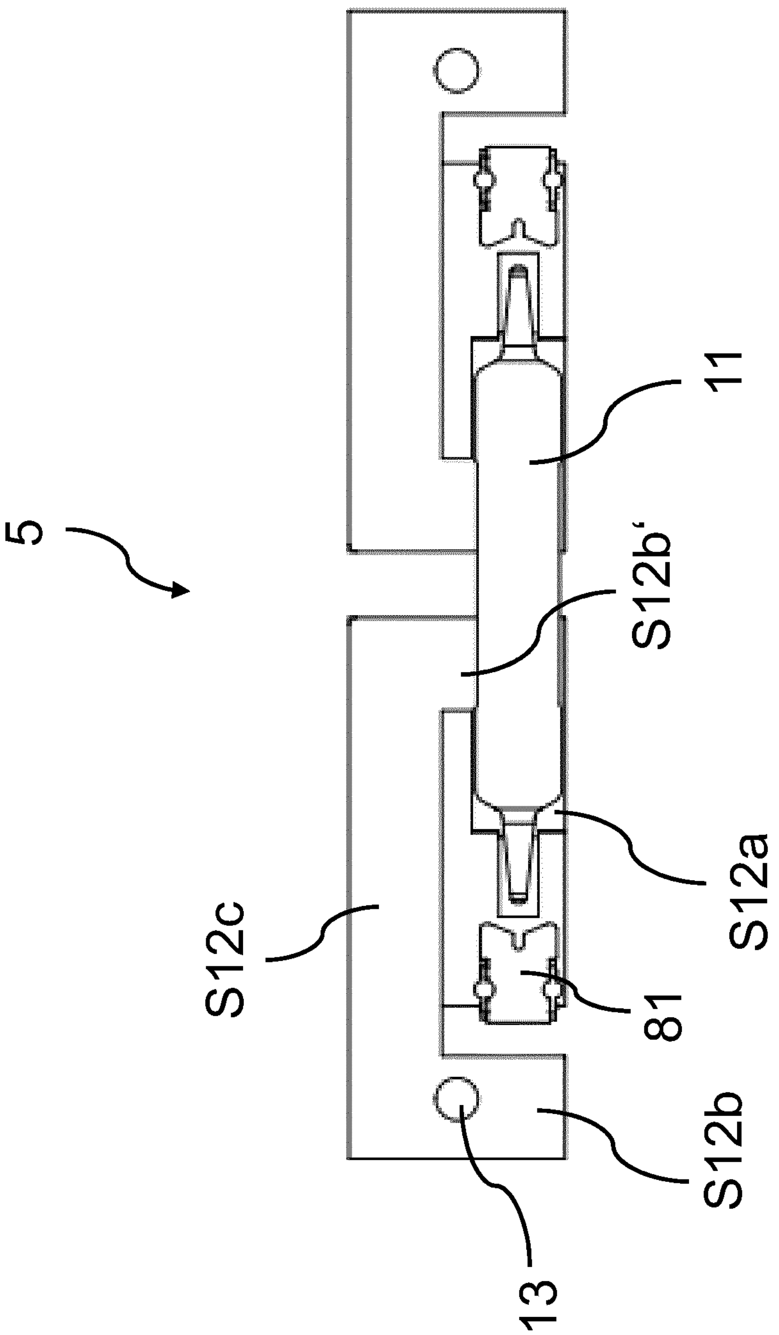
FIG. 5A shows a top view on an embodiment of a switchable contacting device having an open flat stationary contact device with internal passive cooling functionality.
Figure 5B:
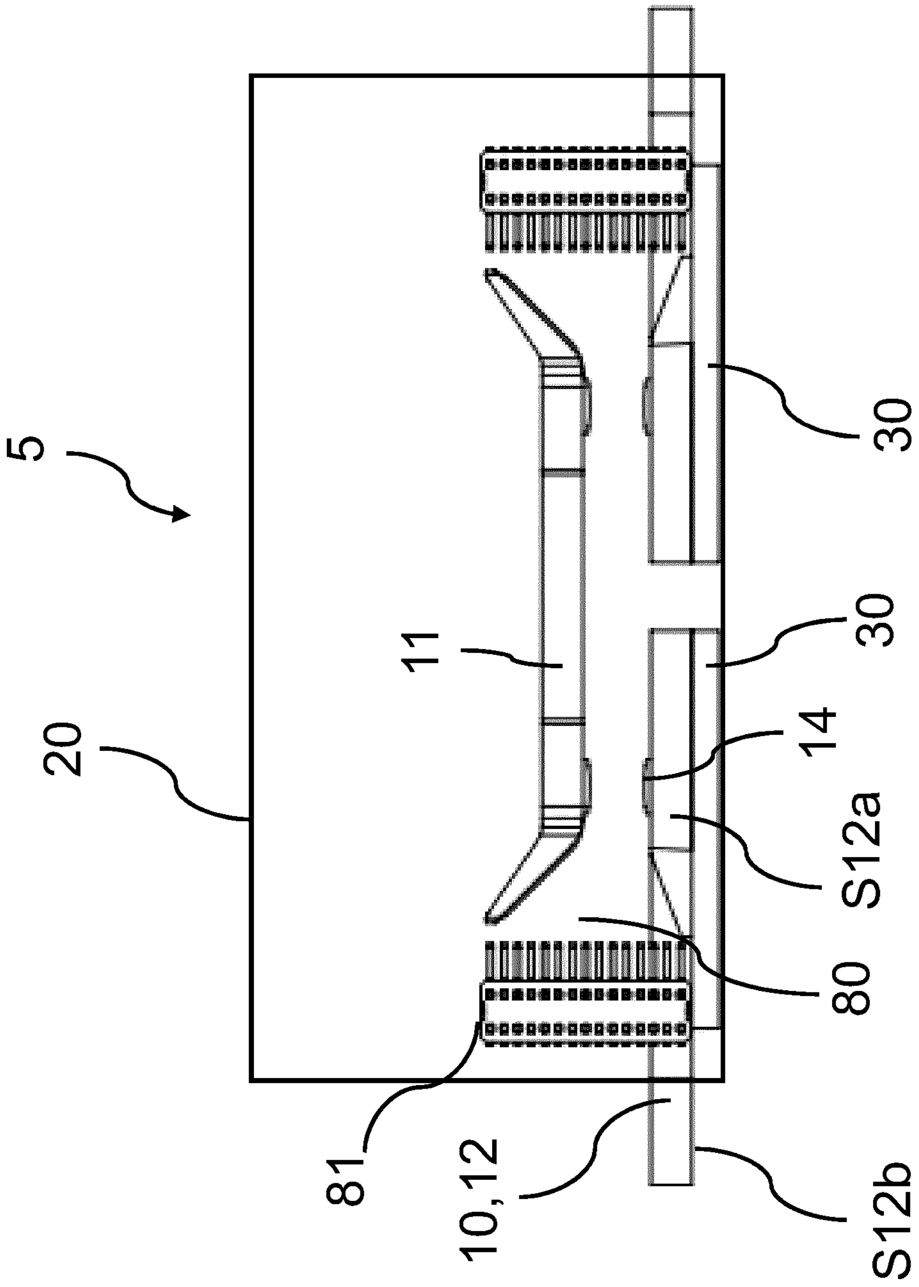
FIG. 5B shows a cross-sectional view of an embodiment of a switchable contacting device having an open flat stationary contact device with internal passive cooling functionality.
Figure 5C:
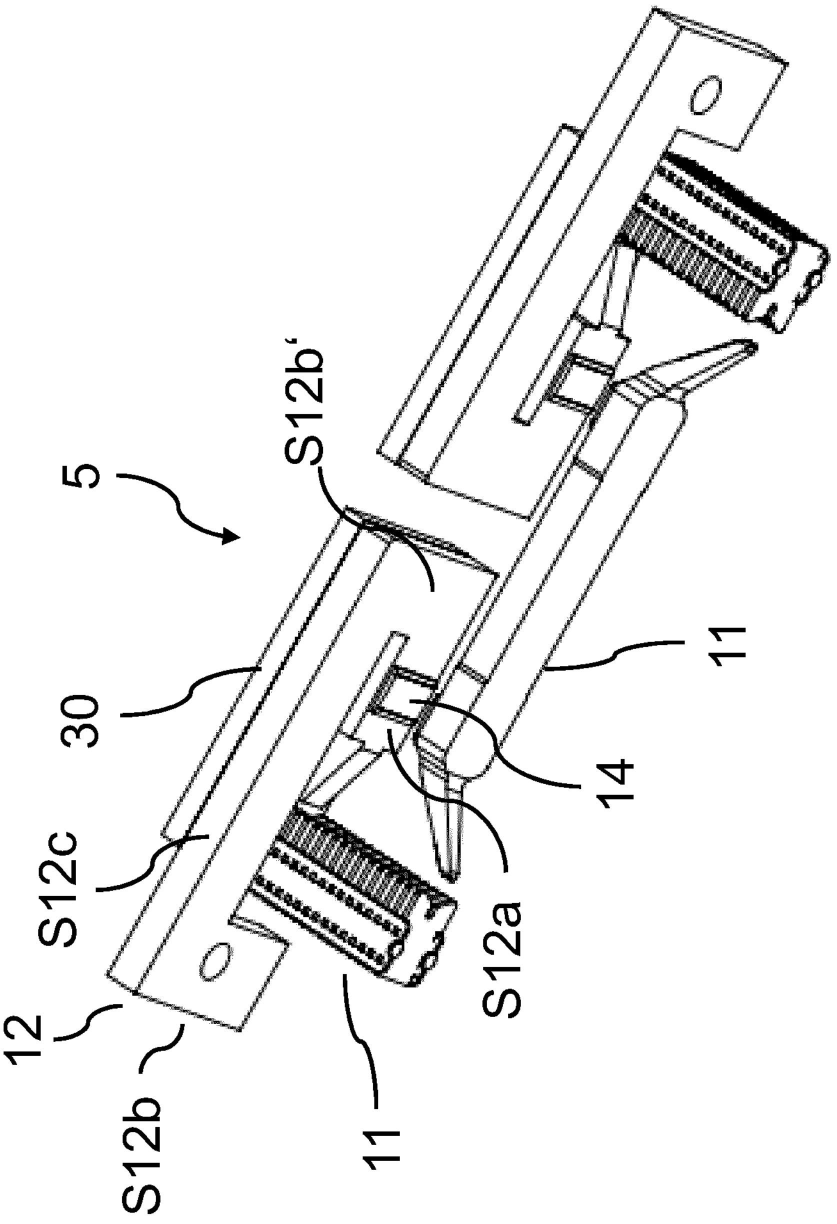
FIG. 5C shows a perspective view of an embodiment of a switchable contacting device having an open flat stationary contact device with internal passive cooling functionality.

Referring to the embodiment 5 of the switchable contacting device shown in FIGS. 5A to 5C, the stationary contact device 12 is configured as a flat and open busbar. The stationary contact device 12 has a first section S12*a*, a second section S12*b*, a third section S12*c* and a fourth section S12*b*'. All sections S12*a*, S12*b*, S12*c* and S12*b*' are arranged in one spatial plane, i.e. there are no out-of-plane bent sections lying between the individual sections S12*a*, S12*b*, S12*c* and S12*b*'.

In the top view (FIG. 5A), sections S12*a*, S12*b*, S12*c* and S12*b*' are rectangular in shape. Section S12*c* connects sections S12*b* and S12*b*' and is arranged perpendicular to the sections S12*b* and S12*b*'. Sections S12*c* and S12*a* are arranged parallel to each other and spaced apart from each other by a small gap there between. Section S12*a* is arranged perpendicular to section S12*b*' and parallel to section S12*c*. Section S12*a* extends from an end of section S12*b*' towards section S12*b*, but is shorter than section S12*c* and thus does not contact section S12*b*.

The current is guided from the terminal 13 and thus section S12*b* along the section S12*c* to section S12*b*' and from there to the contact pad 14 on the section S12*a*. On the sections S12*c* and S12*a* the current flows in opposite directions. This causes the direction of the current on the stationary contact device 12 to be rotated due to the special geometry of the stationary contact device 12. Such a current loop is needed to drive the arc into the extinguishing chamber at high short-circuit currents (>5 kA to 30 kA) through the generated intrinsic field.

Figure 6A:
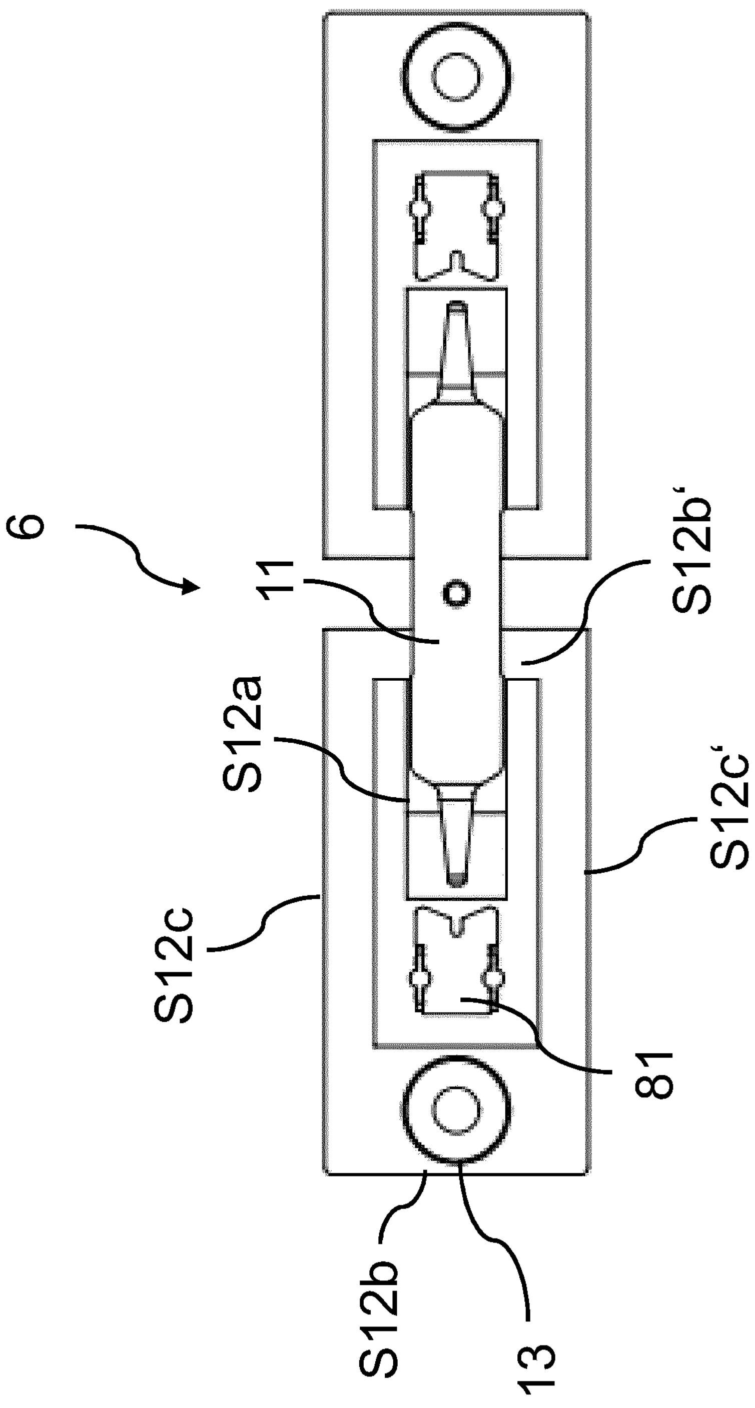
FIG. 6A shows a top view on an embodiment of a switchable contacting device having a closed stationary contact device with internal passive cooling functionality.
Figure 6B:
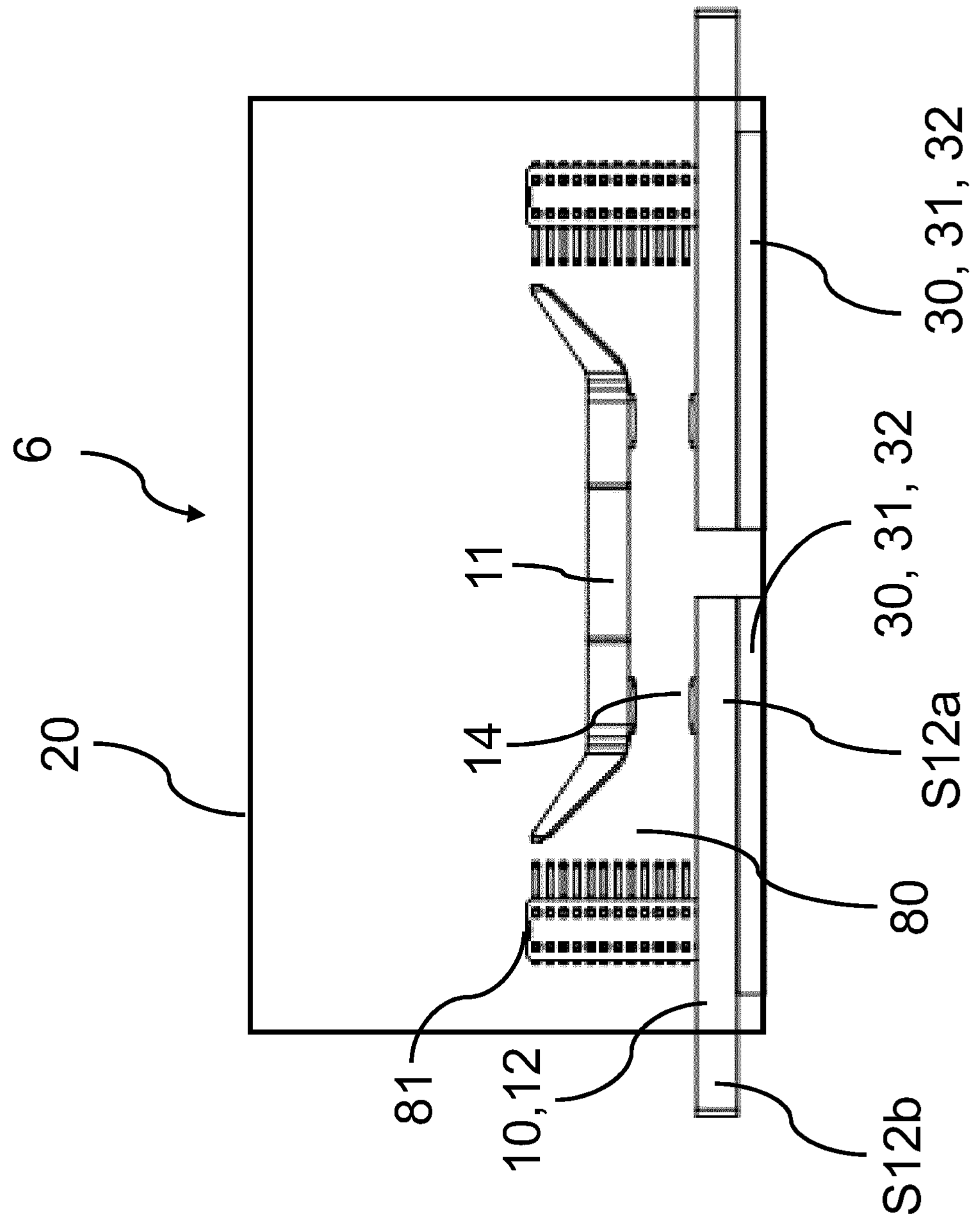
FIG. 6B shows a cross-sectional view of an embodiment of a switchable contacting device having a closed flat stationary contact device with internal passive cooling functionality.
Figure 6C:
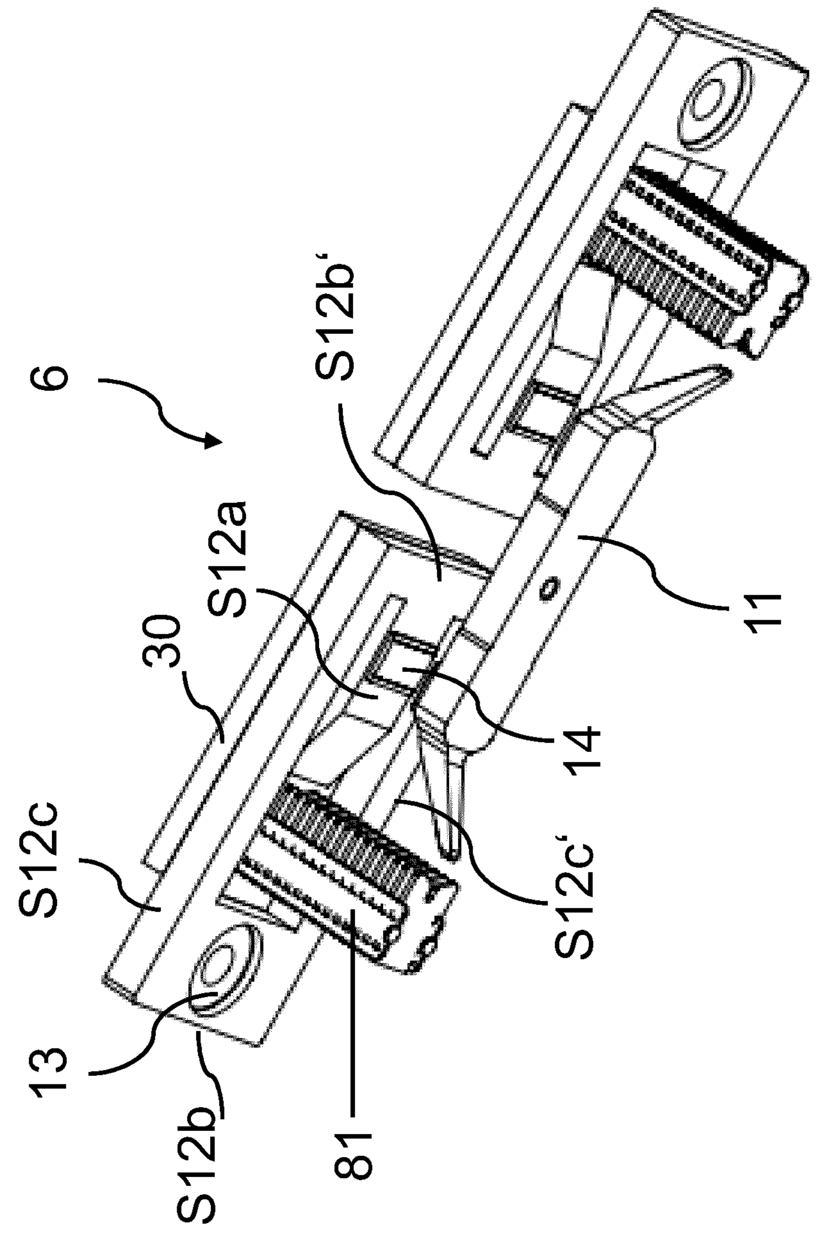
FIG. 6C shows a perspective view of an embodiment of a switchable contacting device having a closed flat stationary contact device with internal passive cooling functionality.

Referring to the embodiment 6 of the switchable contacting device shown in FIGS. 6A to 6C, the stationary contact device 12 is configured as a flat and closed busbar. The stationary contact device 12 has a first section S12*a*, a second section S12*b*, a third section S12*b*', a fourth section S12*c*, and a fifth section S12*c*'. All sections S12*a*, S12*b*, S12*b*', S12*c* and S12*c*' are arranged in one spatial plane, i.e. there are no out-of-plane bent sections lying between the individual sections S12*a*, S12*b*, S12*b*', S12*c* and S12*c*'. As illustrated in the top view (FIG. 6A), sections S12*a*, S12*b*, S12*b*', S12*c* and S12*c*' are rectangular in shape.

Sections S12*c* and S12*c*' connect sections S12*b* and S12*b*', i.e. sections S12*b* and S12*b*' are arranged at opposite ends of sections S12*c* and S12*c*'. Sections 12*c* and 12*c*' are arranged perpendicular to sections S12*b* and S12*b*', and spaced apart from each other by section S12*b* and S12*b*'. Sections S12*b* and S12*b*' are arranged parallel to each other and have the same length. Sections S12*c* and S12*a* are arranged parallel to each other and have the same length.

A free space is formed between sections S12*b*, S12*b*', S12*c* and S12*c*'. Section S12*a* extends from an inner side of section S12*b*' in the free space towards section S12*b*, but is shorter than sections S12*c*, S12*c*' and thus does not contact section S12*b*.

REFERENCES

1, 2, 3, 4 switchable contacting device
5 external thermal mass body
10 current-carrying component
11 movable contact device
12 stationary contact device
13 terminal
14 contact pad
20 housing
30 heat dissipating component
31 thermally conductive mass body
32 thermally conductive pad
33 body
34 flow channel
35 inlet
36 outlet
40 outer connection
50 outer busbar
60 supporting device
70 carrier
80 extinguishing chamber
81 extinguishing plates
90 arc guiding rail
100 permanent magnet
110 yoke

The invention claimed is:

1. A switchable contacting device with cooling functionality, comprising:

a current-carrying component;

a housing for encasing the current-carrying component; and a heat dissipating component, wherein the heat dissipating component is arranged to dissipate heat from the current-carrying component outside the housing, wherein the current-carrying component comprises a movable contact device and a stationary contact device, wherein the stationary contact device has a first section located inside the housing and a second section located outside the housing, wherein the heat dissipating component is arranged inside the housing between the first section of the stationary contact device and the housing, and wherein the heat dissipating component is configured as a thermally conductive pad.

2. The switchable contacting device of claim 1, wherein the stationary contact device comprises a terminal for externally contacting the stationary contact device, the terminal being located in the second section of the stationary contact device, wherein the stationary contact device comprises a contact pad being configured for providing an electrical contact between the stationary contact device and the movable contact device, the contact pad being located in the first section of the stationary contact device, and wherein the stationary contact device is formed so that the current is conducted between the terminal and the contact pad in opposite directions.

3. The switchable contacting device of claim 2, wherein the heat dissipating component is disposed on a surface of the stationary contact device facing away from the contact pad.

4. The switchable contacting device of claim 2, wherein the stationary contact device is embodied as a flat open or closed busbar, wherein the first section and the second section of the stationary contact device are arranged in a spatial plane.

5. The switchable contacting device of any of claim 1, wherein the switchable contacting device is configured as a short circuit switching device or a contactor.

* * * * *